(12) United States Patent
Ye et al.

(10) Patent No.: US 8,373,658 B2
(45) Date of Patent: Feb. 12, 2013

(54) MOTION SENSING SYSTEM

(75) Inventors: Zhou Ye, Foster City, CA (US);
Shun-Nan Liou, Kaohsiung (TW);
Ying-Ko Lu, Taoyuan County (TW);
Ching-Lin Hsieh, Taoyuan County (TW)

(73) Assignee: Cywee Group Limited, Tortola (VG)

( * ) Notice: Subject to any disclaimer, the term of this patent is extended or adjusted under 35 U.S.C. 154(b) by 291 days.

(21) Appl. No.: 12/786,401

(22) Filed: May 24, 2010

(65) Prior Publication Data

US 2011/0285623 A1  Nov. 24, 2011

(51) Int. Cl.
*G06F 3/033* (2006.01)
*G09G 5/08* (2006.01)

(52) U.S. Cl. ....................................................... 345/158

(58) Field of Classification Search .......... 345/156–158, 345/162–163, 169
See application file for complete search history.

(56) References Cited

U.S. PATENT DOCUMENTS

| 7,239,301 | B2 | 7/2007 | Liberty |
| 2005/0210417 | A1* | 9/2005 | Marvit et al. ................. 715/863 |
| 2005/0253806 | A1* | 11/2005 | Liberty et al. ................ 345/156 |
| 2009/0115725 | A1* | 5/2009 | Shemesh et al. .............. 345/158 |

* cited by examiner

*Primary Examiner* — Amr Awad
*Assistant Examiner* — Kenneth Bukowski
(74) *Attorney, Agent, or Firm* — Ding Yu Tan

(57) ABSTRACT

A motion sensing system includes a hand-held device and a receiver device. The hand-held device includes a microcontroller, a G-sensor (one 3-axis accelerometer), only one 2-axis gyroscope, and a wireless transmitter. The receiver device is preferably a dongle and includes a microcontroller and a wireless receiver. A first axis of the 2-axis gyroscope is parallel to the Z axis of the hand-held device and the second axis of the 2-axis gyroscope forms an acute angle α with the X axis of the hand-held device. The acute angle α allows the microcontroller of the receiver device to calculate rotational data around each of the three axis of the hand-held device.

10 Claims, 7 Drawing Sheets

MOTION SENSING SYSTEM

BACKGROUND OF THE INVENTION

1. Field of the Invention

The present application relates to a motion sensing system, and more particularly to system of a motion sensing hand-held device having only two rotational sensors and a corresponding receiver device capable of generating rotational data around 3-axes based on output of the hand-held device.

2. Description of the Prior Art

When a motion-sensing pointing device is held by a user and pointed at a monitor, rotational axes are predefined as the Z axis pointing to the ground, the Y axis is in the direction from the pointing device to the monitor, and the X axis is at right angles to both the Z and the Y axes. In a system using a conventional pointing device, only the rotational outputs around the X and Z axes are needed for moving a cursor in the X'Y' plane of the display screen. Therefore, when the conventional pointing device is used for pointing only, only two rotational outputs are needed.

Such a system is illustrated in U.S. Pat. No. 7,239,301, issued to Liberty et al., and herein incorporated by reference in its entirety. The patent discloses a conventional pointing device that includes an accelerometer that measures the acceleration it experiences and two rotation sensors for determining rotations around the X and Z axes. The rotational outputs are modified based on the acceleration determined by the accelerometer. The disclosed conventional pointing device provides rotational outputs around the X and Z axes only, and does not illustrate determining rotation around the third axis Y.

However, if a pointing device is to be integrated in a game system, the game system may need the rotational output around any one of the three axes (X, Y, Z), for playing a tennis or a golf game as examples, but the conventional pointing device cannot provide the third rotational output. Therefore, there is a need to provide a motion sensing system capable of determining the rotation around any of three axes without increasing the hardware cost.

SUMMARY OF THE INVENTION

A motion sensing system includes a hand-held device and a receiver device. The hand-held device includes a microcontroller, a G-sensor (one 3-axis accelerometer), only one 2-axis gyroscope, and a wireless transmitter. The receiver device is preferably a dongle and includes a microcontroller and a wireless receiver. A first axis of the 2-axis gyroscope is parallel to the Z axis of the hand-held device and the second axis of the 2-axis gyroscope forms an acute angle α with the X axis of the hand-held device. The acute angle α allows the microcontroller of the receiver device to calculate rotational data around each of the three axis of the hand-held device.

A method for operating a motion sensing system includes a microprocessor of the hand-held device receiving sensed acceleration data from a 3-axis accelerometer and rotational data from the two rotational sensors and outputting the received data to a wireless transmitter. The data is transmitted to a wireless receiver of the receiver device and output to a second microprocessor. The second microprocessor calculates rotational data around each of the three axis of the hand-held device according to the received data and the acute angle formed between an axis of one of the two rotational sensors and one axis of the hand-held device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
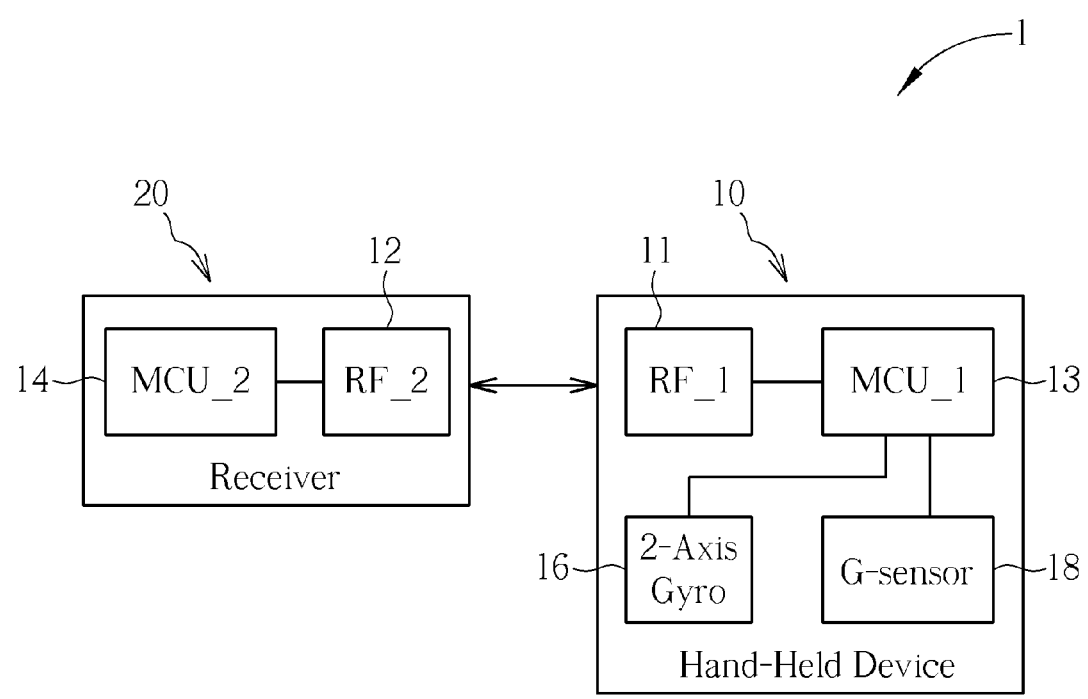
FIG. 1 is a block diagram of a motion sensing system according to the present application.

Please refer to FIG. 1. A motion sensing system 1 comprises a hand-held device 10 (such as a wireless game controller) and a receiver device 20. The hand-held device 10 may include a microcontroller (MCU_1) 13, a G-sensor (one 3-axis accelerometer) 18, only one 2-axis gyroscope 16, and a wireless transmitter (RF_1) 11. The receiver device 20 (preferably a dongle) may include a microcontroller (MCU_2) 14, a wireless receiver (RF_2) 12, and a connection port not shown (preferably a Universal Serial Bus) able to be connected to a computer (such as desktop or Notebook).

Beginning with the hand-held device 10, the G-sensor 18 can sense accelerations along any of three axes with its 3-axis accelerometer and output an analog or digital version of the sensed acceleration data. The 2-axis gyroscope 16 (Gyro) can sense angular speeds for any of the three X, Y, Z axes with its 2-axis gyro and output an analog or digital version of the sensed angular speed data. The microcontroller (MCU_1) 13 receives the data from both the G-sensor 18 and the 2-axis gyroscope 16 and if necessary converts the received data into digital data, may calibrate the digital data, and outputs the digital data to the wireless transmitter (RF_1) 11, from which it can be transmitted to the receiver device 20.

The wireless receiver (RF_2) 12 of the receiver device 20 can receive the digital data transmitted by the wireless transmitter (RF_1) 11 and output the received data to the microcontroller (MCU_2) 14. The microcontroller (MCU_2) 14 can then determine a gesture or motion applied to the hand held device 10 according to the received data, and may output corresponding control signals via the connection port, possibly to a computer.

Figure 2:
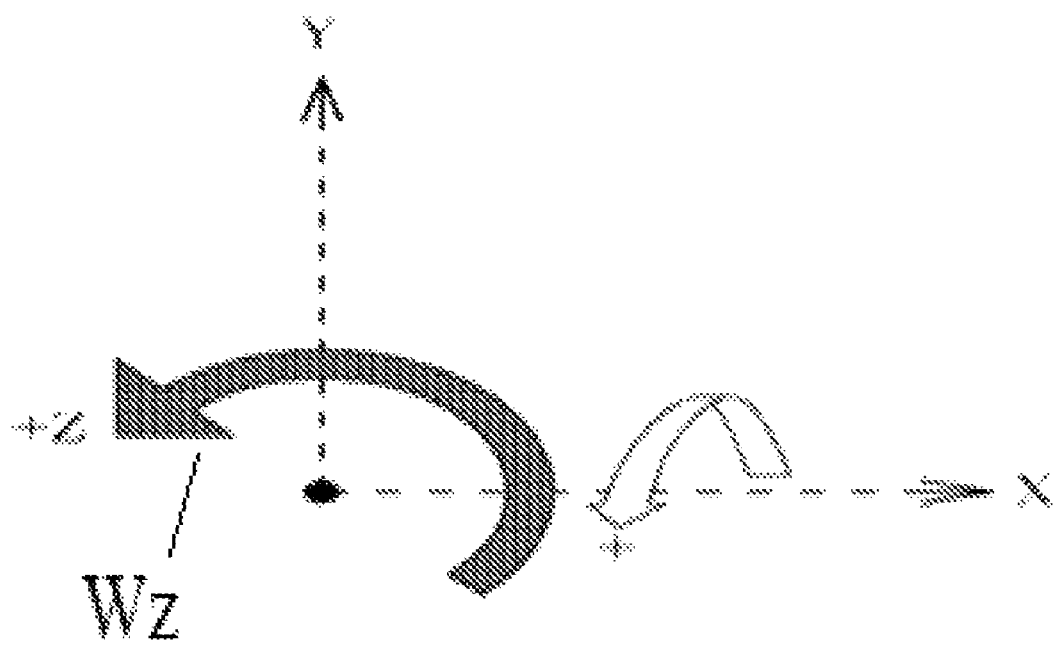
FIG. 2 illustrates rotations around the X and Z axes of a hand-held motion sensing device.

For ease in understanding and not to be considered a limitation of the motion sensing system 1, normal orientation of the hand-held device 10 will be discussed herein as having its Z axis substantially perpendicular to the ground plane, and its Y axis along the pointing direction of the hand-held device 10. The X axis of the hand-held device 10 is determined at right angles to both the Y and Z axes as shown in FIG. 2.

Figure 3:
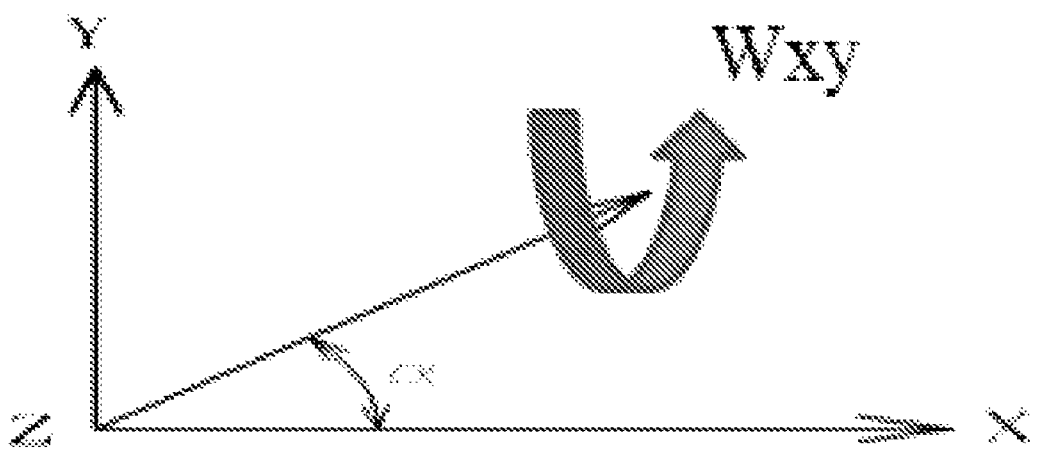
FIG. 3 illustrates the acute angle formed between an axis of the 2-axis gyroscope and the pointing direction of the hand-held motion sensing device.

FIG. 3 shows example architecture of one embodiment that further illustrates but does not limit the present invention. Here, a first of the two axes of the 2-axis gyro may be parallel to the Z axis of the hand-held device 10 (normally perpendicular to the ground) and a second axis of the 2-axis gyro is in the hand-held device's XY plane but strayed from the X axis in a non-zero acute angle, α. Using this architecture, the angular speed can then be calculated around any of the orthogonal X, Y, or Y axes shown in FIG. 2 of the hand-held device 10 using the sensed acceleration and sensed angular speed data respectively from the G-sensor 18 and the 2-axis gyroscope 16.

Figure 4:
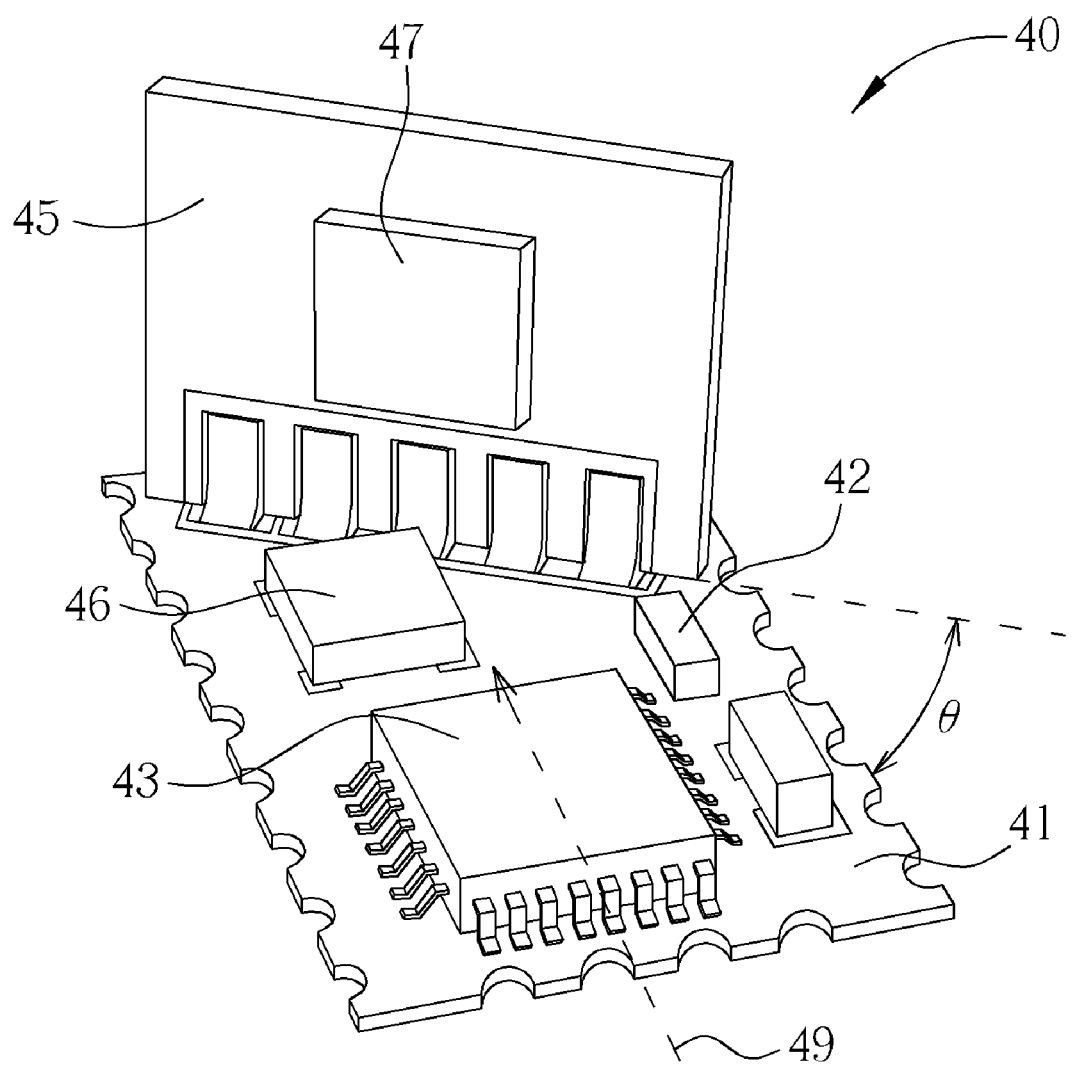
FIG. 4 is a block diagram of the hand-held motion sensing device of FIG. 3.

An example of such hand-held device 40 is illustrated in FIG. 4 in a home position where a microprocessor 43 is electronically coupled to a G-sensor 46 (one 3-axis accelerometer), and a wireless transmitter 42 and all three 42, 43, 46 may be mounted on a first surface 41, possibly a printed circuit board. The 3 axes of the 3-axis accelerometer 46 preferably form the 3 axes of the hand-held device. The plane of the first surface 41 is preferably substantially parallel to the XY plane of the hand-held device, where the Z axis is perpendicular to the ground and the Y axis is the pointing direction (shown as item 49) of the hand-held device 40.

A single 2-axis gyroscope 47 (has two rotational sensors) may be mounted on a second surface 45, also possibly a PCB, and is electrically coupled to the microprocessor 43. A first axis of the 2-axis gyroscope 47 is parallel to the Z axis of the hand-held device 40 and the second axis of the 2-axis gyroscope 47 forms an acute angle α with the X axis of the hand-held device 40. Thus the second axis of the 2-axis gyroscope 47 also forms an acute angle α with the X axis of the G-sensor 46.

Figure 5:
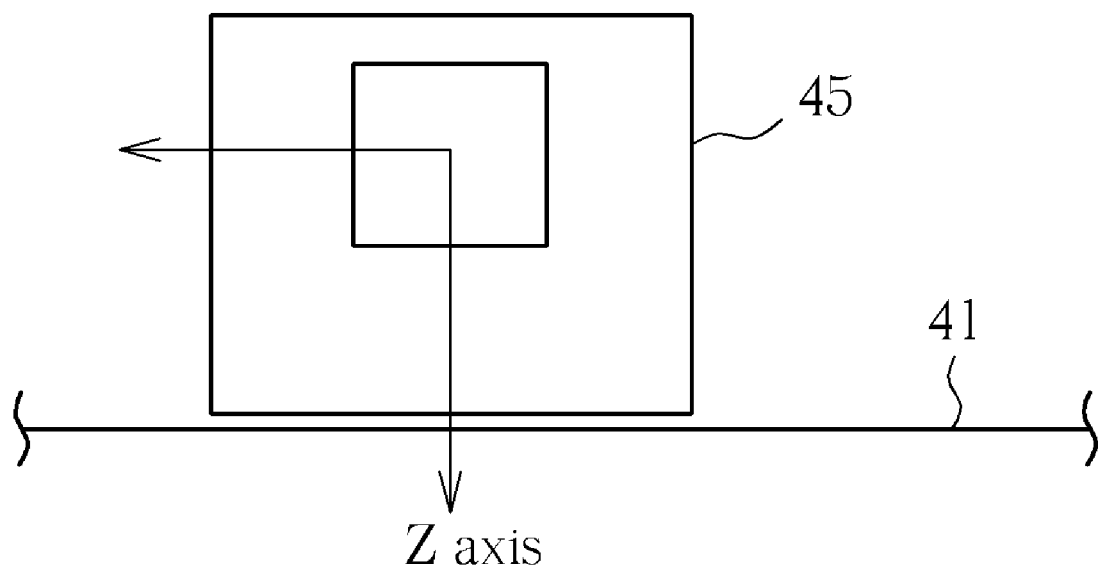
FIG. 5 is a side view illustration of hand-held motion sensing device of FIG. 3 showing orientations of each of the axes in the 2-axis gyroscope.

FIG. 5 is a side view illustration of hand-held motion sensing device of FIG. 3 showing orientations of each of the axes in the 2-axis gyroscope, where an axis of a first rotational sensor of the 2-axis gyroscope is perpendicular to the first surface 41 (and ground) and an axis of a second rotational sensor of the 2-axis gyroscope forms an acute angle with the pointing direction of the hand-held device 40.

When a user rotates the hand-held device 40 away from the home position, the microprocessor 43 receives the analog data from the G-sensor 46 and the 2-axis gyroscope 47, converts the received data into digital data if necessary, may calibrate the digital data, and outputs the digital data to the wireless transmitter 42, from which the digital data can be transmitted to the receiver device 20. The wireless receiver (RF_2) 12 of the receiver device 20 can receive the digital data transmitted by the wireless transmitter (42 and output the received digital data to the microcontroller (MCU_2) 14 which can then determine a gesture or motion applied to the hand held device 40 according to the received calibrated digital data and the acute angle α.

The microcontroller (MCU_2) 14 can determine a gesture or motion via calculation of the tilt angle θ of the hand-held device relative to the home position so that the Z axis of the hand-held device is no longer perpendicular to the ground plane, for example, by using the following formulas:

$$A \cdot B = |A| \times |B| \times \cos \theta$$

$$\cos \theta = A \cdot B / (|A| \times |B|)$$

where "A" is the measured acceleration by the G-sensor 46 and "B" is the unit vector of the normal vector of the ground plane.

Once the tilt angle θ is known, the microcontroller (MCU_2) 14 can then calculate the angular speed of the hand-held device 40. When the hand-held device 40 rotates around the Z, X, or Y axis, the angular speed around the Z, X or Y axes is:

$$Z\_rotation = Wz \times \cos \theta + (Wxy/\sin \alpha) \times \sin \theta$$

$$X\_rotation = -Wz \times \sin \theta + (Wxy/\sin \alpha) \times \cos \theta$$

$$Y_{13} \text{ rotation} = Wxy/\sin(90° - \alpha)$$

where "W" is the angular speed, "α" is the acute angle formed between the second axis of the 2-axis gyroscope 47 and the X axis of the hand-held device 40, and as shown in FIG. 2, Wz is the angular velocity with respect to the Z-axis, and as shown in FIG. 3, Wxy is the angular velocity with respect to the XY plane, and "θ" is the tilt angle θ calculated above. In addition, the "x" in between "Wz" and "cosθ in the above Z rotation equation is a multiplication symbol.

Figure 6:
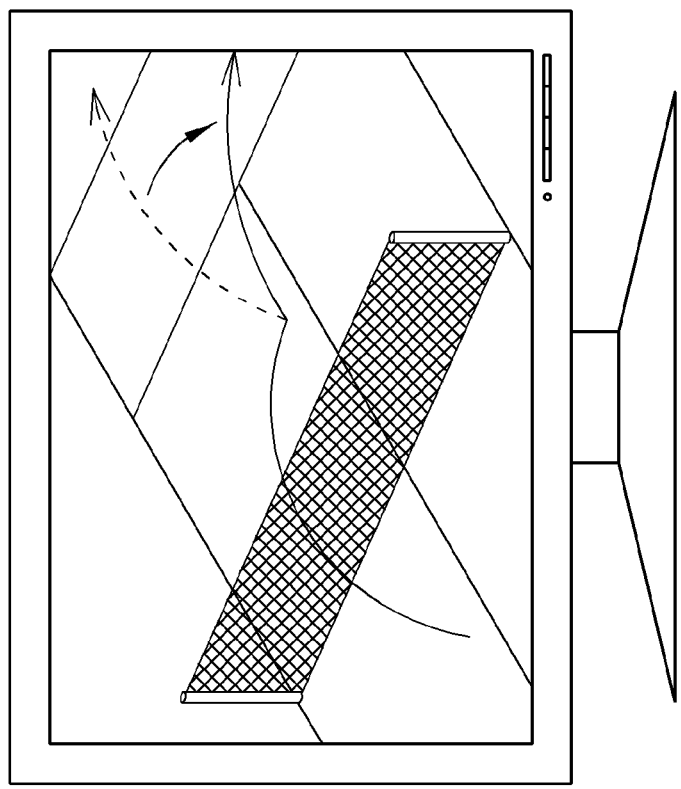
FIG. 6 illustrates a possible application of the hand-held device of FIG. 3.
Figure 6:
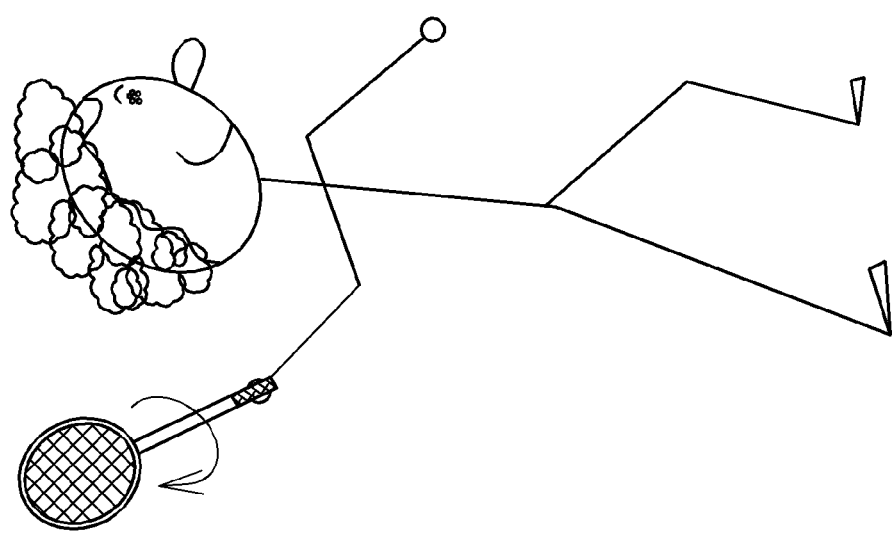

The addition of the rotation around the Y axis can be used to increase controls or realism in various applications. For examples, when playing a tennis game, the hand-held device 40 can be moved like the tennis racket and rotation around the Y axis of the hand-held device 40 can be calculated for detecting the spin motion intended by the player to be imparted to the ball as shown in FIG. 6. In this scenario, the tennis game software program can modify the speed/direction of the hit tennis ball and/or the bounced distance of the bounced tennis ball based on the hitting direction (top spin or under spin) and/or spin speed of the hand-held device 40. In FIG. 6, a player twisting their wrist to longitudinally rotate a tennis racket is shown to aid conception of one possible motion. In reality, the tennis racket would be replaced by the hand-held device 40, but rotated the same way as the racket. Because the rotation of the hand-held device 40 is around the pointing direction of the hand-held device 40, the rotation corresponds to rotation around the Y axis. On the display of the shown computer with which the player is playing the PC tennis game is shown the player's opponent's part of a tennis court and a curved line indicating the path of the ball. In this case, without rotation of the hand-held device 40, the path of the ball is shown as a solid line arching over the net down to the court floor where it would bounce back up, now following the natural trajectory shown as a dotted line, basically in a straight line away from the player. However, because the player has rotated the hand-held device 40 around its Y axis, spin has been placed on the ball so that when the ball bounces, the ball changes direction due to the spin and follows the solid line extending from the bounce across the opponent's court as shown. The amount and direction of spin may be adjusted according to the speed and direction of the rotation of the hand-held device 40.

Figure 7:
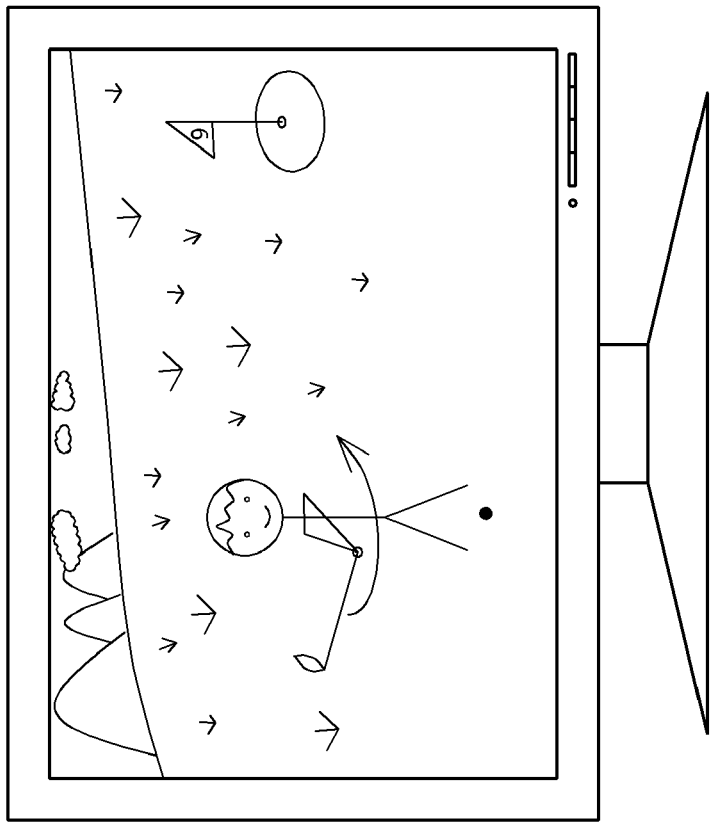
FIG. 7 illustrates another possible application of the hand-held device of FIG. 3.
Figure 7:
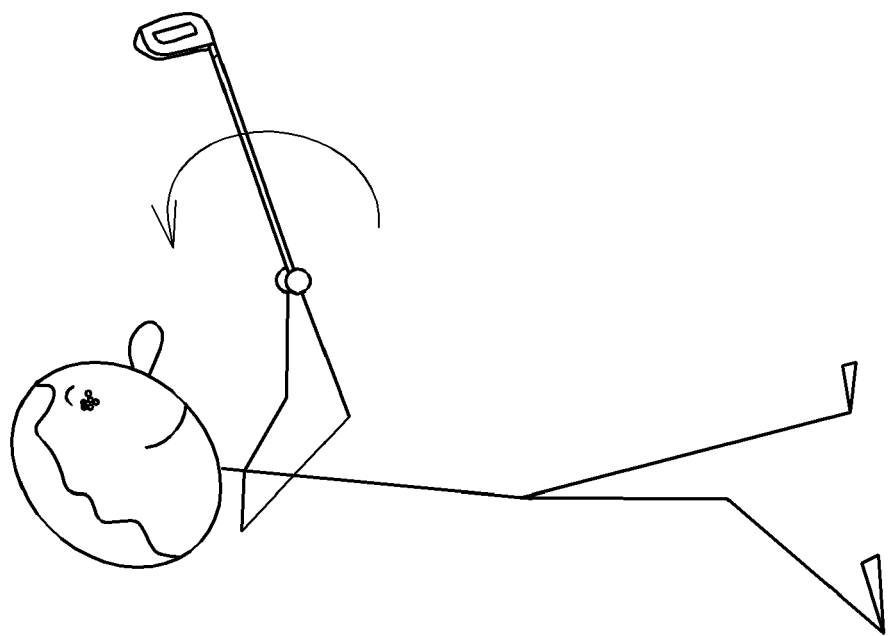

Another example is shown in FIG. 7. When playing a golf game, the hand-held device 40 is like the golf club and the rotation around the Y axis can be calculated for detecting the rotation of the player during the swing. Again, in FIG. 7, a golf club is shown as a conceptual aid but would in reality be the hand-held device 40. The player can rotate the hand-held device 40 around its Y axis, and this rotation may be translated and perhaps shown by the golf game on the nearby computer as rotation of a player's body that a player would perform when actually driving a golf ball. The golf game software program can modify the hit distance and flying direction of the hit golf ball based on the speed and direction of rotation of the hand-held device 40.

The above describes a best mode of operation, but suitable modifications of the hand-held device 40 are possible and intended to fall within the scope of the application. For example, the locations of the microprocessor 43, the wireless transmitter 42, the G-sensor 46, and the 2-axis gyroscope 47 may be altered due to design considerations. In some embodiments the 2-axis gyroscope 47 may be placed directly on the first surface 41 and the second surface 47 may be eliminated. Additionally, alignment of the first axis of the 2-axis gyroscope with the Z axis of the hand-held device simplifies computations, but is not necessary for a modified hand-held device to work as intended. Another embodiment forms the acute angle α with the Y axis of the G-sensor 46 instead of the X axis, with corresponding alterations made in the described formulas for calculating tilt angle and angular speeds. All embodiments, however, comprise an acute angle α between at least one of the axes of the single 2-axis gyroscope 47 and an axis, preferably the axis aligned with the normal pointing direction of the hand-held device 40. The acute angle allows computation of rotational data around each of the three X, Y, and Z axes of the hand-hand device 40.

In summary, previous devices that use only two rotation sensors, such as a 2-axis gyroscope, are only able to calculate rotation around two axes. To include rotation around the third axis required the additional expense of a third rotational sensor. However, the present applications' re-alignment of a single 2-axis gyroscope within a hand-held motion sensing device so that at least one of the axes of the single 2-axis gyroscope forms an acute angle with the pointing direction (the Y axis) of the hand-held motion sensing device saves hardware expense while allowing calculation of rotational data around each of the three X, Y, and Z axes of the hand-held motion sensing device.

Those skilled in the art will readily observe that numerous modifications and alterations of the device and method may be made while retaining the teachings of the invention.

What is claimed is:

1. A motion sensing system comprising;
a motion sensing device having three perpendicular axes, a pointing direction along a first axis of the three perpendicular axes, and only two rotational sensors arranged to form a non-zero acute angle between a second axis of the three perpendicular axes and an axis of a first of the rotational sensors, a 3-axis accelerometer having the axes aligned with the three perpendicular axes, and a first microprocessor coupled to receive output from the 3-axis accelerometer and output from the two rotational sensors; and
a receiver device, the receiver device comprising a wireless receiver and a second microprocessor, wherein the second microprocessor generating rotational data around 3 axes of the motion sensing device according to the non-zero acute angle, the second microprocessor calculating 3-axis angular speeds of the motion sensing device according to $Z\_rotation = Wz \times \cos\theta + (Wxy/\sin\alpha) \times \sin\theta$ $X\_rotation = -Wz \times \sin\theta + (Wxy/\sin\alpha) \times \cos\theta$ $Y\_rotation = Wxy/\sin(90°-\alpha)$ where "W" is the angular speed, "α" is the acute angle, and "θ" is the tilt angle θ.

2. The motion sensing system of claim 1 wherein the motion sensing device further comprises a transmitter coupled to receive output of the first microprocessor.

3. The motion sensing system of claim 2 wherein the wireless receiver is coupled to output to a second microprocessor.

4. The motion sensing system of claim 3 wherein the receiver device is a Universal Serial Bus dongle.

5. The motion sensing system of claim 3 wherein the transmitter is a wireless transmitter.

6. The motion sensing system of claim 1 wherein an axis of a second of the rotational sensors is substantially parallel with a third axis of the three perpendicular axes.

7. A method for operating a motion sensing system, the motion sensing system comprising a hand-held device and a receiver device, the band-held device including a wireless transmitter, a first microprocessor, a 3-axis accelerometer, and only two rotational sensors, an axis of a first of the two rotational sensors forming an acute angle with at least one axis of the 3-axis accelerometer, the receiver device comprising a wireless receiver and a second microprocessor, the method comprising:
the first microprocessor receiving sensed acceleration data from the 3-axis accelerometer and rotational data from the two rotational sensors and outputting the received data to the wireless transmitter;
the wireless transmitter transmitting the received data to the wireless receiver;
the wireless receiver transmitting the received data to the second microprocessor; and
the second microprocessor generating rotational data around 3 axes of the hand-held device according to the acute angle, and calculating 3-axis angular speeds of the hand-held device according to $Z\_rotation = Wz \times \cos\theta + (Wxy/\sin\alpha) \times \sin\theta$ $X\_rotation = Wz \times \sin\theta + (Wxy/\sin\alpha) \times \cos\theta$ $Y\_rotation = Wxy/\sin(90°-\alpha)$ where "W" is the angular speed, "α" is the acute angle, and "θ" is the tilt angle θ.

8. The method of claim 7 further comprising the second microprocessor calculating a tilt angle θ of the hand-held device.

9. The method of claim 8 further comprising calculating the tilt angle θ according to $A \cdot B = |A| \times |B| \times \cos\theta$ $\cos\theta = A \cdot B / (|A| \times |B|)$ where "A" is the sensed acceleration data and "B" is a unit vector of a normal vector to a ground plane.

10. The method of claim 7 further comprising outputting game control signals based on the 3-axis angular speeds.

* * * * *